United States Patent [19]

Webb

[11] 4,011,770
[45] Mar. 15, 1977

[54] MOTION TRANSMITTING REMOTE CONTROL ASSEMBLY

[75] Inventor: Grant A. Webb, Northville, Mich.

[73] Assignee: Teleflex Incorporated, North Wales, Pa.

[22] Filed: Aug. 8, 1975

[21] Appl. No.: 602,999

[52] U.S. Cl. .......................... 74/501 R; 24/73 AP; 85/5 R; 248/74 PB; 74/501 P
[51] Int. Cl.² .......................................... F16C 1/00
[58] Field of Search ............... 74/501 R, 501 P; 24/73 AP, 73 P, 73 PF; 248/71, 65, 73, 74 PB; 85/5 R

[56] References Cited

UNITED STATES PATENTS

| | | | |
|---|---|---|---|
| 2,560,961 | 7/1951 | Knohl | 85/5 R |
| 2,733,067 | 1/1956 | Moore et al. | 85/5 R X |
| 3,164,054 | 1/1965 | Biesecker | 74/501 P UX |
| 3,259,347 | 7/1966 | Yates | 248/73 |
| 3,393,431 | 7/1968 | Saunders | 24/73 PF |
| 3,398,600 | 8/1968 | White et al. | 74/501 P |
| 3,427,894 | 2/1969 | Tschanz | 74/501 P |
| 3,905,270 | 9/1965 | Hehl | 24/73 PF X |

Primary Examiner—Martin P. Schwadron
Assistant Examiner—G. L. Walton
Attorney, Agent, or Firm—McGlynn and Milton

[57] ABSTRACT

A motion transmitting remote control assembly of the type for transmitting motion in a curved path by a flexible motion transmitting core element movably supported by a conduit with support fittings at each end of the conduit for snapping into mechanical interlocking engagement in an aperture in a wall. Two embodiments of the support fitting are disclosed, one being manually removable from the aperture while the other is not. The support fittings include flanges for engaging the wall on the inserting side of the aperture with a generally U-shaped body extending from the flanges. Snap-in legs extend from the bottom of the U-shaped body in a cantilevered fashion to define a shoulder adjacent and spaced from the flange means for engaging against the wall at the opposite extremity of the aperture. Pilot posts are defined by the U-shaped body and are disposed laterally at the sides of the snap-in legs to define the ends of the body portion, i.e., the pilot posts define the four corners of the body portion. The removable embodiment includes a channel extending laterally across each of the legs to define the shoulder for engaging the opposite extremity of the aperture and tabs generally aligned with the flanges for disposition on the inserting side of the aperture whereby the tabs may be moved toward one another to remove the fitting from the aperture.

11 Claims, 4 Drawing Figures

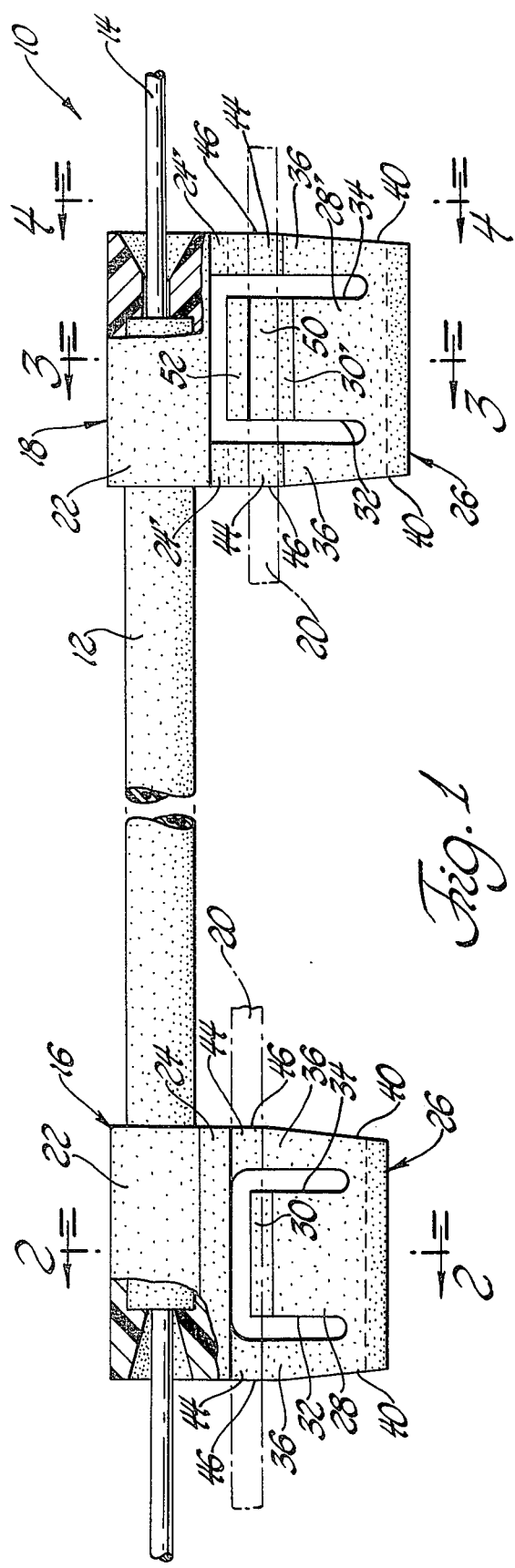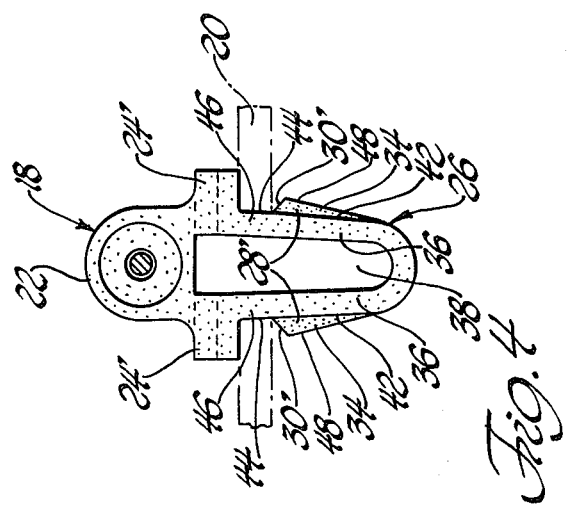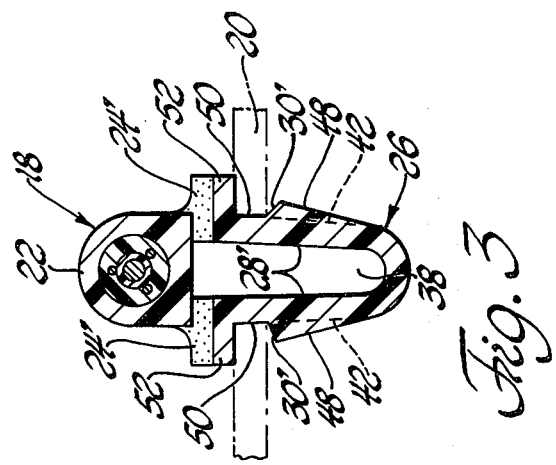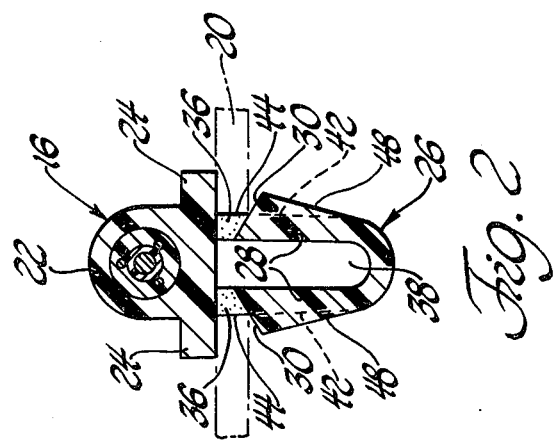

MOTION TRANSMITTING REMOTE CONTROL ASSEMBLY

This invention relates to a motion transmitting remote control assembly which is normally operated to control a device by transmitting tension or compression in a curved path by means of a flexible motion transmitting core element.

Remote control assemblies of the type with which the instant invention is particularly applicable typically include a conduit, which movably supports a motion transmitting core element, and fittings disposed on the conduit and adapted to be attached to a support structure. Fittings may also be attached to the core element for attaching the core element to control members. Such remote control assemblies are frequently utilized in aircraft, marine vehicles, and automobiles or other similar equipment.

The fittings which attach the core element to a control member or which support the conduit frequently engage an aperture by being snapped into mechanical engagement with the aperture. Examples of such fittings are shown in U.S. Pat. No. 3,398,600 to D. E. White et al and U.S. Pat. No. 3,427,894 to A. E. Tschanz, both of which are assigned to the assignee of the subject application. Other snap-in supports utilized in other environments are shown in U.S. Pat. No. 921,691 to Friday, U.S. Pat. No. 2,424,757 to Klumpp and U.S. Pat. No. 2,891,103 to Swengel.

One problem with known support fittings is that once they are snapped into position in an aperture they may be manipulated so that they may be inadvertently removed. In other words, the fittings may be angled relative to the apertures whereby it is possible that the fittings are inadvertently removed from the aperture upon being engaged laterally.

The subject invention solves this problem by providing a support fitting for snapping into mechanical interlocking engagement with a wall having an aperture therein and includes leg means supported in a cantilevered fashion for moving through the aperture and snapping into engagement with the wall at the opposite extremity of the aperture for retaining support fitting therein and pilot means disposed laterally outwardly of the leg means for guiding the support fitting into the aperture and for engaging the periphery of the aperture to prevent movement of the support fitting which will allow its inadvertent removal from the aperture.

Other advantages of the present invention will be readily appreciated as the same becomes better understood by reference to the following detailed description when considered in connection with the accompanying drawings wherein:

FIG. 1 is an elevational view partially broken away and in cross section of a remote control assembly utilizing the support fittings of the subject invention;

FIG. 2 is a cross-sectional view taken substantially along line 2—2 of FIG. 1;

FIG. 3 is a cross-sectional view taken substantially along line 3—3 of FIG. 1; and FIG. 4 is a view taken substantially along line 4—4 of FIG. 1.

A motion transmitting remote control assembly of the type for transmitting motion in a curved path by a flexible motion transmitting core element is generally shown at 10. The motion transmitting remote control assembly 10 includes a guide means comprising the conduit 12 which movably supports the flexible motion transmitting core element 14. The conduit 12 is preferably made of plastic and may be of the type including an inner tubular plastic member surrounded by a wire sheath or a plurality of helically disposed long lay wires encased in an outer plastic casing. The core element 14 is preferably a wire-like member.

There are disclosed two embodiments of the support fitting, one generally indicated at 16 and one generally indicated at 18. In the following description like numbers will be utilized to indicate like components and features of the support fittings 16 and 18.

The support fittings 16 and 18 are shown attached to the conduit 12 for supporting the conduit 12 but it should be appreciated that fittings 16 and 18 may be attached to the core element 14 for attaching the core element 14 to a control member. The support fittings 16 and 18 are to be disposed in apertures in a wall 20.

The support fittings 16 and 18 include attaching portions 22 which are disposed about the conduit 12. The attaching portions 22 may be molded of plastic and disposed about the outer casing of the conduit 12 so as to be integral therewith.

The fittings include flange means defined by the two flanges 24 in the fitting 16 and by the four flanges 24' in fitting 18 for engaging the wall 20 on the inserting extremity of the aperture to prevent the fittings 16 and 18 from moving through the apertures in the wall 20 as the fittings are inserted therein.

A body generally indicated at 26 extends from the flanges 24 and 24'. A pair of spaced flexible legs 28 in fitting 16 and 28' in fitting 18 extend from the body 26 generally towards the flanges 24 and 24' in a cantilevered fashion and define shoulders 30 for fitting 16 and shoulders 30' for fitting 18 disposed in spaced relationship to the respective flanges. The legs 28 and 28' move through the apertures in the wall 20 as the respective fittings are inserted therein to engage the wall at the opposite extremity of the aperture for retaining the fittings in the apertures in the wall 20. The shoulders 30 and 30' are tapered or inclined downwardly in a direction away from the central axis or away from the flanges 24 and 24' of the respective fittings so as to account for the various thicknesses of walls in which the fittings may be disposed.

Each of the legs 28 and 28' have first and second laterally spaced sides 32 and 34 extending from the body 26 upwardly toward the flanges 24 and 24'. The bodies 26 include pilot means comprising the pilot posts 36 disposed laterally outwardly of each of the sides 32 and 34 of the legs 28 and 28' respectively for guiding each of the fittings 16 and 18 into the apertures in the wall 20.

The body 26 of each fitting has a generally U shape, as viewed in cross section, to define a completely void space 38 extending laterally completely from end to end through each respective fitting 16 and 18. The void space 38 is disposed between the pilot posts 36 and between the legs 28 and 28' so that the legs 28 and 28' may flex toward one another. The legs 28 and 28' and the respective pilot posts 36 are integrally connected to one another adjacent the base of the U shape as the legs 28 and 28' are separated from the remainder of the body by a generally U-shaped space extending completely transversely through the body and forming a part of the void space 38.

The bodies 26 have four corners and each fitting includes four pilot posts 36 with each pilot post 36 disposed at and defining one of the corners. The pilot posts 36 which are disposed laterally of one of the legs 28 or 28' are separated by the void space 38 from the other two pilot posts disposed laterally of the other of the legs 28 or 28' of the respective fittings. The pilot posts 36 are also paired to define the ends of the body of each fitting 16 and 18.

As best illustrated in FIG. 1, the ends of the body 26 defined by a pair of pilot posts 36 includes at least portions 40 which are tapered inwardly toward the central axis of each respective fitting in a direction toward the base of the U shape or in a direction away from the respective flanges 24 or 24'. In addition, at least a portion 42 of each of the outward surfaces of the pilot posts 36 is tapered inwardly in a direction toward the base of the U shape and away from the respective flanges 24 and 24'. Such tapered surfaces facilitate the insertion of the fittings into an aperture as they render the entire bottom portion of the body somewhat frusto-conical. Additionally, the outward surfaces of the pilot posts 36 include upper portions 44 which are generally parallel to one another and perpendicular to the flanges 24 and 24' respectively and extend from the flanges to the tapered portions 42. In a similar fashion each of the end surfaces of the pilot posts 36 or ends of the body portion include portions 46 which are generally parallel to one another and to the portions 44 and perpendicular to the flanges 24 and 24' and extend from the flanges to the tapered portions 40. Thus, the tapered portions 40 and 42 facilitate the insertion of the fittings into an aperture whereas the straight portions 44 and 46 engage the periphery of the four sided or rectangular aperture to prevent any cocking or lateral movement of the fitting within the aperture. In other words, the upper portions of the four pilot posts 36 engage the corners of an aperture and the snap-in legs 28 and 28' are disposed laterally inwardly of the pilot posts 36.

The outward surfaces 48 of the legs 28 and 28' respectively taper outwardly in a direction towards the flanges 24 and 24' or in a direction upwardly from the base of the U shape. The portions of the outward surfaces 48 adjacent the shoulders 30 and 30' are normally disposed outwardly of the tapered portions 42 of the outward surfaces of the pilot posts 36. Thus, as each fitting is inserted into an aperture the outwardly tapered surfaces 48 of the legs 28 and 28' force the legs to flex inwardly toward one another until the fitting is in the aperture where the legs will snap outwardly to engage the opposite extremity of an aperture in the wall 20.

The legs 28 in the fitting 16 terminate at a distal end defined by the shoulders 30. In contrast, the fitting 18 differs from the fitting 16 in that the legs 28' thereof include a channel 50 extending laterally thereacross for receiving the wall 20 and defining the shoulder 30' which engages the opposite extremity of the aperture in the wall 20. The channel 50 also defines the tabs 52 extending outwardly in a direction transverse to the void space 38. The tabs 52 have their bottom surfaces in general alignment with the bottom surfaces of the flanges 24', however, such is not necessary, as the tabs 52 may be disposed above the bottom surfaces of the flanges 24'. The support fitting 18 may be removed from an aperture in the wall 20 as the tabs 52 are disposed on the inserting side of the aperture and may be moved toward one another by manually grasping them to disengage the shoulders 30' from the wall 20 and moving the shoulders 30 into the aperture.

Since the pilot posts 36 are disposed in firm engagement with a rectangular aperture in the wall 20 to prevent cocking or lateral movement of the fittings relative to the wall 20 to prevent the inadvertent withdrawal of the fittings from the aperture, the tabs 52 may be provided for manually removing the fitting 18 from the wall 20.

Both of the fittings 16 and 18 extend laterally from the axis of the remote control assembly, i.e., the axis of the conduit 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting remote control assembly of the type for transmitting motion in a curved path by a flexible motion transmitting core element, said assembly comprising: guide means; a flexible motion transmitting core element movably supported by said guide means; a support fitting for disposition in an aperture and attached to one of said guide means and said core element, said support fitting including flange means for engaging the wall at one extremity of the aperture to prevent the fitting from moving through the aperture as it is inserted therein, a body extending from said flange means, a pair of spaced flexible legs extending from said body generally toward said flange means in a cantilevered fashion and defining shoulders disposed in spaced relationship to said flange means for moving through the aperture as said fitting is inserted therein and to engage the wall at the opposite extremity of the aperture for retaining the fitting therein, each of said legs having first and second laterally spaced sides extending from said body toward said flange means, said body including pilot means disposed laterally outwardly of each of said sides of said legs for guiding said fitting into the aperture, said body having a generally U shape in cross section to define a completely void space extending laterally therethrough between said pilot means and between said legs so that said legs may flex toward one another, said legs and said pilot means being integrally connected adjacent the base of said U shape.

2. An assembly as set forth in claim 1 wherein each of said legs include a channel extending laterally thereacross for receiving the wall and defining said shoulders for engaging the opposite extremity of the aperture and defining a tab extending outwardly whereby said support fitting may be removed from the aperture from the inserting extremity thereof by moving said tabs toward one another to disengage said shoulders from the wall and moving them into the aperture.

3. An assembly as set forth in claim 1 wherein said body has four corners and said pilot means comprise four pilot posts with each pilot post disposed at one of said corners, said pilot posts disposed laterally of one of said legs being separated by said void space from said pilot posts disposed laterally of the other of said legs, said pilot posts being paired to define the ends of said body.

4. An assembly as set forth in claim 3 wherein at least a portion of the outward surfaces of said pilot posts are tapered inwardly in a direction toward said base of said U shape.

5. An assembly as set forth in claim 4 wherein each of said ends of said body defined by a pair of said pilot posts includes at least portions which are tapered inwardly in a direction toward said base of said U shape.

6. An assembly as set forth in claim 5 wherein said outward surfaces of said pilot posts and each of said ends include portions which are generally parallel to each other and perpendicular to said flange means and extend from said flange means to said tapered portions thereof.

7. An assembly as set forth in claim 6 wherein the outward surfaces of said legs taper outwardly in a direction toward said flange means.

8. An assembly as set forth in claim 7 wherein at least a portion of said outward surfaces of said legs are normally disposed outwardly of said tapered portions of said outward surfaces of said pilot posts.

9. An assembly as set forth in claim 8 wherein each of said legs include a channel extending laterally thereacross for receiving the wall and defining said shoulders for engaging the opposite extremity of the aperture and defining a tap extending outwardly whereby said support fitting may be removed from the aperture from the inserting extremity thereof by moving said tabs toward one another to disengage said shoulders from the wall and moving them into the aperture.

10. A support fitting for disposition in an aperture in a wall, or the like, and comprising: flange means for engaging the wall at one extremity of the aperture to prevent the fitting from moving through the aperture as it is inerted therein, a body extending from said flange means, a pair of spaced flexible legs extending from said flange means, a pair of spaced flexible legs extending from said body generally toward said flange means in a cantilevered fashion and defining shoulders disposed in spaced relationship to said flange means for moving through the aperture as said fitting is inserted therein and to engage the wall at the opposite extremity of the aperture for retaining the fitting therein, each of said legs having first and second laterally spaced sides extending from said body toward said flange means, said body including pilot means disposed laterally outwardly of each of said sides of said legs for guiding said fitting into the aperture, said body having a generally U shape in cross section to define a completely void space extending laterally therethrough between said pilot means and between said legs so that said legs may flex toward one another, said legs and said pilot means being integrally connected adjacent the base of said U shape.

11. A support fitting as set forth in claim 10 wherein each of said legs include a channel extending laterally thereacross for receiving the wall and defining said shoulders for engaging the opposite extremity of the aperture and defining a tab extending outwardly whereby said support fitting may be removed from the aperture from the inserting extremity thereof by moving said tabs toward one another to disengage said shoulders from the wall and moving them into the aperture.

* * * * *